United States Patent
Krishnan et al.

(10) Patent No.: US 11,538,319 B2
(45) Date of Patent: Dec. 27, 2022

(54) IDENTIFYING A DISTRIBUTED THREAT IN A SECURITY ZONE

(71) Applicant: KYNDRYL, INC., New York, NY (US)

(72) Inventors: Venkatesh Krishnan, Singapore (SG); Rambabu Parvatina, Singapore (SG); Ahmed Hassan, Singapore (SG); Changwoo Jung, Singapore (SG)

(73) Assignee: KYNDRYL, INC., New York, NY (US)

( * ) Notice: Subject to any disclaimer, the term of this patent is extended or adjusted under 35 U.S.C. 154(b) by 165 days.

(21) Appl. No.: 17/027,798

(22) Filed: Sep. 22, 2020

(65) Prior Publication Data
US 2022/0092953 A1 Mar. 24, 2022

(51) Int. Cl.
| | |
|---|---|
| G08B 13/22 | (2006.01) |
| G07C 9/00 | (2020.01) |
| G08B 21/18 | (2006.01) |
| G06N 5/04 | (2006.01) |
| G06N 20/00 | (2019.01) |

(52) U.S. Cl.
CPC ............. *G08B 13/22* (2013.01); *G06N 5/04* (2013.01); *G06N 20/00* (2019.01); *G07C 9/00896* (2013.01); *G08B 21/182* (2013.01)

(58) Field of Classification Search
CPC ........ G08B 13/22; G08B 21/182; G06N 5/04; G06N 20/00; G07C 9/00896
See application file for complete search history.

(56) References Cited

U.S. PATENT DOCUMENTS

| | | |
|---|---|---|
| H2110 H | 10/2004 | Newman |
| 7,212,113 B2 | 5/2007 | Zanovitch |

(Continued)

FOREIGN PATENT DOCUMENTS

CN    102203801 B    3/2014

OTHER PUBLICATIONS

"Method and System for Interpreting Scanned Security Images using Cognitive Solutions", IP.com No. IPCOM000255971D, IP.com Electronic Publication Date: Oct. 26, 2018, 3 pps., <https://priorart.ip.com/IPCOM/000255971>.

(Continued)

*Primary Examiner* — Curtis J King
(74) *Attorney, Agent, or Firm* — Zilka-Kotab, P.C.

(57) ABSTRACT

Aspects of the present invention disclose a method for identification of a distributed prohibited item across various dimensions as well as spatial and/or temporal spaces. The method includes one or more processors assigning an identifier to each container of a plurality of containers entering a defined area. The method further includes determining one or more subcomponents of the plurality of containers entering the defined area that correspond to one or more prohibited items. The method further includes generating a set of subcomponents corresponding to a first prohibited item of the one or more prohibited items based at least in part on the plurality of containers. The method further includes determining whether the set of subcomponents corresponding to the first prohibited item exceeds a prohibited item threshold of the defined area based on a weighted sum of the set of subcomponents, which is a score related to the set of subcomponents.

20 Claims, 5 Drawing Sheets

(56) References Cited

U.S. PATENT DOCUMENTS

| | | | |
|---|---|---|---|
| 7,218,704 B1* | 5/2007 | Adams | G01T 3/06 |
| | | | 378/57 |
| 2004/0098276 A1 | 5/2004 | Blazey | |
| 2005/0157842 A1* | 7/2005 | Agrawal | G01N 23/04 |
| | | | 378/27 |
| 2005/0206514 A1 | 9/2005 | Zanovitch | |
| 2005/0251398 A1 | 11/2005 | Zanovitch | |
| 2007/0058037 A1* | 3/2007 | Bergeron | G01V 5/0016 |
| | | | 348/82 |
| 2007/0217572 A1* | 9/2007 | Kotowski | G01V 5/0008 |
| | | | 378/57 |
| 2007/0269005 A1* | 11/2007 | Chalmers | G01N 23/20 |
| | | | 378/57 |
| 2009/0257555 A1* | 10/2009 | Chalmers | G01V 5/0025 |
| | | | 378/57 |
| 2010/0189226 A1* | 7/2010 | Kotowski | G01T 7/00 |
| | | | 378/57 |
| 2012/0243741 A1 | 9/2012 | Shet | |
| 2020/0143643 A1* | 5/2020 | Kusens | G08B 21/0476 |
| 2020/0193368 A1* | 6/2020 | Bhatia | B60R 25/25 |
| 2020/0193666 A1* | 6/2020 | Cinnamon | G06V 10/82 |
| 2020/0320814 A1* | 10/2020 | Hastings | G08B 21/182 |
| 2021/0185176 A1* | 6/2021 | Ardrey | E05B 41/00 |
| 2022/0066063 A1* | 3/2022 | Goh | G06K 9/6272 |

OTHER PUBLICATIONS

Alkheder et al., "Hold baggage security screening system in Kuwait International Airport using Arena software", Civil Engineering Department, College of Engineering and Petroleum, Kuwait University, Ain Shams Engineering Journal, Accepted Oct. 23, 2019, 10 pps., <https://www.sciencedirect.com/science/article/pii/S2090447919301546>.

Egiazarov et al., "Firearm Detection and Segmentation Using an Ensemble of Semantic Neural Networks", arXiv:2003.00805v1 [cs.CV] Feb. 11, 2020, 8 pps., <https://arxiv.org/pdf/2003.00805.pdf>.

Hattenschwiler et al., "Automation in airport security X-ray screening of cabin baggage: Examining benefits and possible implementations of automated explosives detection", Applied Ergonomics 72 (2018) 58-68, <https://www.sciencedirect.com/science/article/pii/S000368701830108X>.

PCTISA220_ISR&WO_Nov. 29, 2021; International App No. PCT/CN2021/116234; 9 pages.

\* cited by examiner

310

| Prohibited Item | Name | W001:TC001 | W002:TC002 | W003:TC003 | W004:TC004 | W005:TC005 | W006:TC006 |
|---|---|---|---|---|---|---|---|
| TE0001 | Item A | 0.3: Structure A | 0.2: Structure B | 0.2: Structure C | 0.1: Structure D | 0.05:Structure E | 0.05:Structure F |
| TE0002 | Item B | 0.2: Material A | 0.2: Material D | 0.2: Material E | 0.1: Material F | ... | ... |
| TE0003 | Item C | 0.3: Material B | 0.2: Structure G | 0.2: Structure H | 0.1: Structure I | 0.05: Material G | 0.05: Structure J |
| TE0004 | Item D | 0.5: Material C | 0.2: Structure G | 0.1: Structure I | 0.1: Material G | ... | ... |

| Baggage ID | Time Stamp | Prob:TC001 | Prob:TC002 | Prob:TC003 | Prob:TC004 | Prob:TC005 |
|---|---|---|---|---|---|---|
| B0001 | 2000 12/03/2019 | 0.7: Structure C | 0.7: Structure A | 0.3: Structure B | 0.5: Material A | 0.03: Material E |
| B0002 | 1600 12/03/2019 | 0.8: Structure B | 0.6: Structure L | 0.4: Material C | 0.4: Material C | |
| B0003 | 1430 12/03/2019 | 0.5: Structure K | | | | |
| B0004 | 0830 12/03/2019 | 0.4: Structure G | | | | |

| Baggage ID | Time Stamp | Prob:TC001 | Prob:TC002 | Prob:TC003 | Prob:TC004 | Prob:TC005 |
|---|---|---|---|---|---|---|
| B0001 | 2000 12/03/2019 | 0.7: Structure C | 0.7: Structure A | | 0.5: Material A | |
| B0002 | 1600 12/03/2019 | 0.8: Structure B | 0.6: Structure L | 0.4: Material C | 0.4: Material C | |
| B0003 | 1430 12/03/2019 | 0.5: Structure K | | | | |
| B0004 | 0830 12/03/2019 | 0.4: Structure G | | | | |

FIG. 3C

| Threat Element | Name | W001:TC001 | W002:TC002 | W003:TC003 | W004:TC004 | W005:TC005 | W006:TC006 | Weighted Sums |
|---|---|---|---|---|---|---|---|---|
| TE0001 | Item A | 0.3: Structure A : B0001 | 0.2:Structure B :B0002 | 0.2:Structure C: B0001 | 0.1:Structure D: B0003 | 0.05:Structure E | 0.05:Structure F | 0.8 |
| TE0002 | Item B | 0.2: Material A : B0001 | 0.2: Material D | 0.2: Material E | 0.1: Material F | ... | | 0.2 |
| TE0003 | Item C | 0.3: Material B | 0.2:Structure G: B0004* | 0.2: Structure H | 0.1: Structure I | 0.05: Material G | 0.05: Structure J | 0.0 |
| TE0004 | Item D | 0.5: Material C : B0002 | 0.2:Structure G: B0004* | 0.1: Structure I | 0.1: Material G | | | 0.5 |

FIG. 3D

| Threat Element | Name |
|---|---|
| TE0001 | Item A 0.8 |
| Baggage IDs List | |
| B0001 | |
| B0002 | |
| B0003 | |

FIG. 3E

IDENTIFYING A DISTRIBUTED THREAT IN A SECURITY ZONE

BACKGROUND OF THE INVENTION

The present invention relates generally to the field of security screening systems, and more particularly to identifying a distributed threat across multiple scan dimensions.

In recent years, implementation of different kinds of scanning equipment are utilized in efforts to secure areas such as airports and public and/or private buildings. Security scanning equipment is used to check personal items for dangerous items such as weapons, chemicals, and/or liquids that are not allowed as they may pose safety concerns. Current screening mechanisms at entry points of secure areas are primarily manual and aided by systems like X-Ray machines and computers, which are utilized by personnel to detect prohibited items that may be hidden.

Cognitive analytics combines the use of cognitive computing and analytics. Cognitive computing combines artificial intelligence and machine-learning algorithms, in an approach that attempts to reproduce the behavior of the human brain. Analytics is the scientific process of transforming data into insights for making better decisions. Cognitive analytics applies intelligent technologies to bring unstructured data sources within reach of analytics processes for improved and informed decision making.

Machine learning is the scientific study of algorithms and statistical models that computer systems use to perform a specific task without using explicit instructions, relying on patterns and inference instead. Machine learning is seen as a subset of artificial intelligence. Machine learning algorithms build a mathematical model based on sample data, known as "training data," in order to make predictions or decisions without being explicitly programmed to perform the task. Machine learning algorithms are used in a wide variety of applications.

SUMMARY

Aspects of the present invention disclose a method, computer program product, and system for identification of a distributed prohibited item across various dimensions as well as spatial and/or temporal spaces. The method includes one or more processors assigning an identifier to each container of a plurality of containers entering a defined area. The method further includes one or more processors determining one or more subcomponents of the plurality of containers entering the defined area that correspond to one or more prohibited items. The method further includes one or more processors generating a set of subcomponents corresponding to a first prohibited item of the one or more prohibited items based at least in part on the plurality of containers. The method further includes one or more processors determining whether the set of subcomponents corresponding to the first prohibited item exceeds a prohibited item threshold of the defined area based at least in part on a weighted sum of the set of subcomponents, wherein the weighted sum is a score related to the set of subcomponents.

BRIEF DESCRIPTION OF THE DRAWINGS

FIG. 3A is a diagram depicting a table of an output of a prohibited item model, in accordance with embodiments of the present invention.

FIG. 3B is a diagram depicting a table of scan specimens corresponding to one or more containers, in accordance with embodiments of the present invention.

FIG. 3C is a diagram depicting a table of identified specimens corresponding to one or more containers, in accordance with embodiments of the present invention.

FIG. 3D is a diagram depicting a table of states of one or more prohibited items, in accordance with embodiments of the present invention.

FIG. 3E is a diagram depicting a table of a profile of an identified prohibited item, in accordance with embodiments of the present invention.

DETAILED DESCRIPTION

Figure 1:
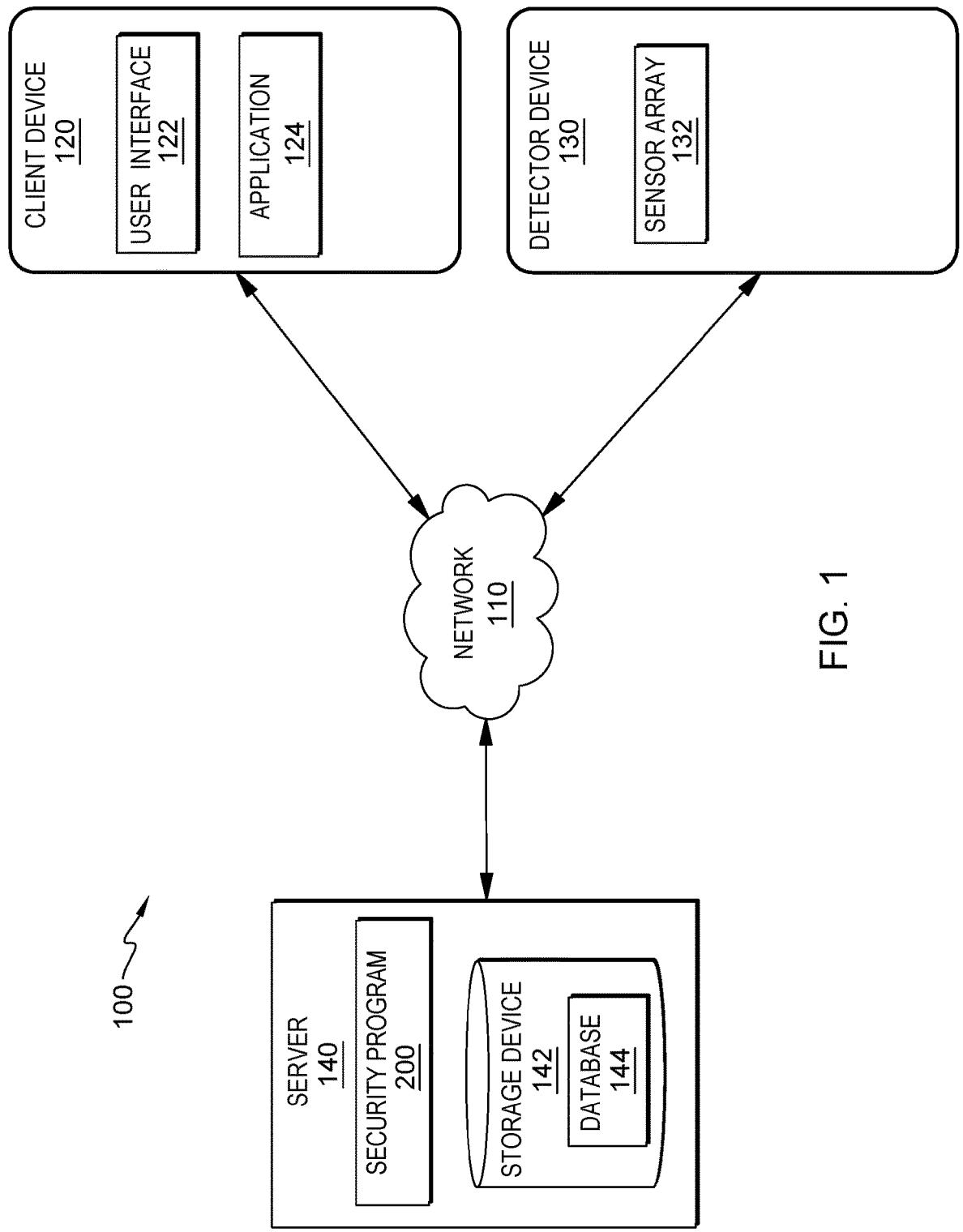
FIG. 1 is a functional block diagram of a data processing environment, in accordance with an embodiment of the present invention.

Embodiments of the present invention allow for identification of a distributed prohibited item across various dimensions as well as spatial and/or temporal spaces. Embodiments of the present invention aggregate a data set corresponding to detected constituents of prohibited items across different scan dimensions into constituent vectors. Embodiments of the present invention generate a prohibited items model table distributed across multiple dimensions based at least in part on the constituent vectors across multiple unstructured and structured data sets. Additional embodiments of the present invention utilize the prohibited items model table and constituent vectors to generate a real-time threat matrix and a threat profile of a prohibited item. In addition, embodiments of the present invention utilize the real-time threat matrix and weights to generate a probability vector of real-time threat existence. Further embodiments of the present invention utilize the probability vector of real-time threat and weights to identify prohibited items.

Some embodiments of the present invention recognize current secure zone security screening systems are manual processes that are not capable of automatically identifying constituents (e.g., sub-parts) of prohibited items. Additionally, embodiments of the present invention recognize that challenges exist in current secure zone security screening systems with respect to correlating and aggregating individual constituents into a prohibited item (e.g., firearm, explosive, etc.). For example, current screening mechanisms at entry points of secure zones are primarily manual (e.g., visual, using X-Ray, chemical). In one scenario, if a prohibited item is presented in whole or in parts in one collection (e.g., container, bag, etc.), then security personnel is likely to identify the existence of the prohibited item. However, in another scenario, if a prohibited item is disassembled into constituents and taken past entry points as individual components spatially (e.g., in different security lanes) and/or temporally (e.g., across a period of time), then individual security screening personnel will likely not be able to correlate the constituents to identify the existence of the prohibited item.

Various embodiments of the present invention overcome existing challenges of screening systems by correlating individual components of prohibited items in spatial and/or temporal dimensions based on machine learning based models, identifying a prohibited item with some probability, and presenting a profile of the prohibited item for further investigation.

Embodiments of the present invention recognize that current secure zone security screening systems are not capable of correlating and aggregating individual constituents into prohibited items with respect to spatial and temporal dimensions. Various embodiments of the present invention advance capabilities of screening systems by utilizing sensor data, which includes individual components of prohibited items, of a plurality of screening systems to counteract distributed circumvention approaches.

Implementation of embodiments of the invention may take a variety of forms, and exemplary implementation details are discussed subsequently with reference to the Figures.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as database 144, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Security program 200 enables the authorized and secure processing of personal data. Security program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Security program 200 provides information regarding personal data and the nature (e.g., type, scope, purpose, duration, etc.) of the processing. Security program 200 provides the user with copies of stored personal data. Security program 200 allows the correction or completion of incorrect or incomplete personal data. Security program 200 allows the immediate deletion of personal data.

Distributed data processing environment 100 includes server 140, detector device 130, and client device 120, all interconnected over network 110. Network 110 can be, for example, a telecommunications network, a local area network (LAN) a municipal area network (MAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140 detector device 130, and client device 120, and other computing devices (not shown) within distributed data processing environment 100.

Client device 120 can be one or more of a laptop computer, a tablet computer, a smart phone, smart watch, a smart speaker, virtual assistant, or any programmable electronic device capable of communicating with various components and devices within distributed data processing environment 100, via network 110. In general, client device 120 represents one or more programmable electronic devices or combination of programmable electronic devices capable of executing machine readable program instructions and communicating with other computing devices (not shown) within distributed data processing environment 100 via a network, such as network 110. Client device 120 may include components as depicted and described in further detail with respect to FIG. 4, in accordance with embodiments of the present invention.

Client device 120 includes user interface 122 and application 124. In various embodiments of the present invention, a user interface is a program that provides an interface between a user of a device and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, e-mail program, or other media, etc.). In one embodiment, application 124 is mobile application software. For example, mobile application software, or an "app," is a computer program designed to run on smart phones, tablet computers and other mobile devices. In another embodiment, application 124 is a web user interface (WUI) and can display text, documents, web browser windows, user options, application interfaces, and instructions for operation, and include the information (such as graphic, text, and sound) that a program presents to a user and the control sequences the user employs to control the program. In another embodiment, application 124 is a client-side application of security program 200. For example, security program 200 utilizes application 124 to provide a threat profile to a user.

In various embodiments of the present invention, detector device 130 may be a desktop computer, a computer server, screening device, or arrays of detector device(s) each including one or more sensor devices specialized for detection of a specific aspect of constituents such as visual (e.g., images, x-rays, etc.), chemical using chemical sensors, and/or any other computer systems, known in the art. In general, detector device 130 is representative of any electronic device or combination of electronic devices capable of sensing the presence of specific types of constituents by means of examining in the visual domain, sensing chemicals and biological hazards with a specific level of confidence embodied by a probability. Additionally, detector device 130 may associate an identified constituent and corresponding probability with an identifier of a container (e.g., baggage, etc.) and report the information to a central analytics module of security program 200. Detector device 130 may include components as depicted and described in further detail with respect to FIG. 4, in accordance with embodiments of the present invention.

Generally, detector device 130 is utilized as a security precaution to scan a specimen (e.g., object, containers, baggage, persons, etc.) to identify different items (e.g., prohibited items) or subcomponent of items (e.g., constituents), which alone may be harmless, that are prohibited due to safety concerns. Detector device 130 includes sensor array 132. Sensor array 132 can be a set of sensors that can analyze a specimen in a given dimension, which may include but is not limited to x-ray, chemical screening, and biohazard screening, for different threat component types. For example, sensor array 132 can include a sensor to detect explosive liquid, biological pathogens, X-Ray imaging or backscatter, etc., which may be accessed and utilized by server 140, such as a database server, a hard disk drive, or a flash memory.

In one embodiment, detector device 130 utilizes sensor array 132 to collect dimensions of one or more specimens entering a defined area. For example, baggage (e.g., specimen, container, etc.) is passed through a screening machine (e.g., detector device 130) that includes one or more sensors (e.g., sensor array 132) that correspond to a dimension to detect X-Ray photographs, traces of chemical compounds and/or biohazardous compounds, etc. (e.g., dimensions) of the baggage. In this example, one or more instances of detector device 130 to scan baggage at multiple locations of the defined area. Additionally, the one or more sensors may include Internet of Things (IoT) capabilities.

In various embodiments, users authorize security program 200 to collect and store information associated with devices, containers, and users, which have authorized the collection of information (i.e., users that have opted-in), in storage device 142. In one scenario, an owner of client device 120 authorizes security program 200 to collect and store data (e.g., bag images, contents of bags, travel itinerary, personal identifiable information, etc.) of the owner. In another scenario, an owner of client device 120 authorizes security program 200 to process collected data of the owner. In an alternative embodiment, users opt-in to utilize security program 200. For example, a user visits a website associated with security program 200 and the users accept the terms and conditions of security program 200 as a part of a registration process to enter a secure area.

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 4, in accordance with embodiments of the present invention.

Server 140 can be a standalone computing device, a management server, a web server, a mobile computing device, a cloud-based computing device or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with client device 120 and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, database 144, and security program 200. Storage device 142 can be implemented with any type of storage device, for example, persistent storage 405, which is capable of storing data that may be accessed and utilized by server 140, such as a database server, a hard disk drive, or a flash memory. In one embodiment storage device 142 can represent multiple storage devices within server 140. In various embodiments of the present invention, storage device 142 stores numerous types of data which may include database 144.

Database 144 may represent one or more organized collections of data stored and accessed from server 140. For example, database 144 includes sensor data, dimensions, generated tables, training data sets, etc. In this example, security program 200 utilizes detector device 130 to capture trace amounts (e.g., sensor data) of chemicals or hazardous materials within a container of a passenger and stores the captured information in a database (e.g., database 144). Additionally, security program 200 utilizes detector device 130 to capture images (e.g., sensor data) of objects within a container of a passenger and stores the captured information in a database (e.g., database 144). Furthermore, security program 200 utilizes the captured information of detector device 130 to generate one or models or tables, which are stored in one or more instances of database 144 of storage device 142.

In one embodiment, data processing environment 100 can include additional servers (not shown) that host additional information that accessible via network 110.

Generally, security program 200 creates a machine learning based model that is utilized to identify the probability of a distributed prohibited item based on various dimensions of a specimen with respect to spatial and/or temporal constraints. In one embodiment, security program 200 retrieves and processes data of sensor array 132. For example, security program 200 retrieves output data (e.g., dimensions) of a series of sensors (e.g., sensor array 132) of a plurality of screening mechanism (e.g., detector device 130) stored on a database (e.g., database 144). In this example, the output data of the sensors is fed into machine learning models that security program 200 utilizes to aggregate the output data and compare the output data readings with pre-trained samples of individual components of a prohibited item. In addition, security program 200 identifies and flags baggage (e.g., specimens, container, etc.) with a probability of the presence of constituents. Furthermore, security program 200 creates data vectors corresponding to individually tracked constituents that are aggregated and tagged per piece of baggage. In another embodiment, security program 200 can consist of one or modules (artificial intelligence, machine learning algorithms, etc.) that perform one or more functions (e.g., threat model generation, distributed threat analysis, aggregation, etc.).

In another embodiment, security program 200 identifies a distributed prohibited item based on data of detector device 130. For example, security program 200 determines whether individually tracked constituents can be combined to generate a prohibited item (e.g., firearm, explosive, etc.) based on space and time constraints. In yet another embodiment, security program 200 generates and transmits a notification to client device 120. In one scenario, if security program 200 determines that a probability of generating a prohibited item exceeds a threshold, then security program 200 transmits a notification to a device of security personnel to intercept individual specimens and associated individuals for further manual analysis and threat mitigation.

Figure 2:
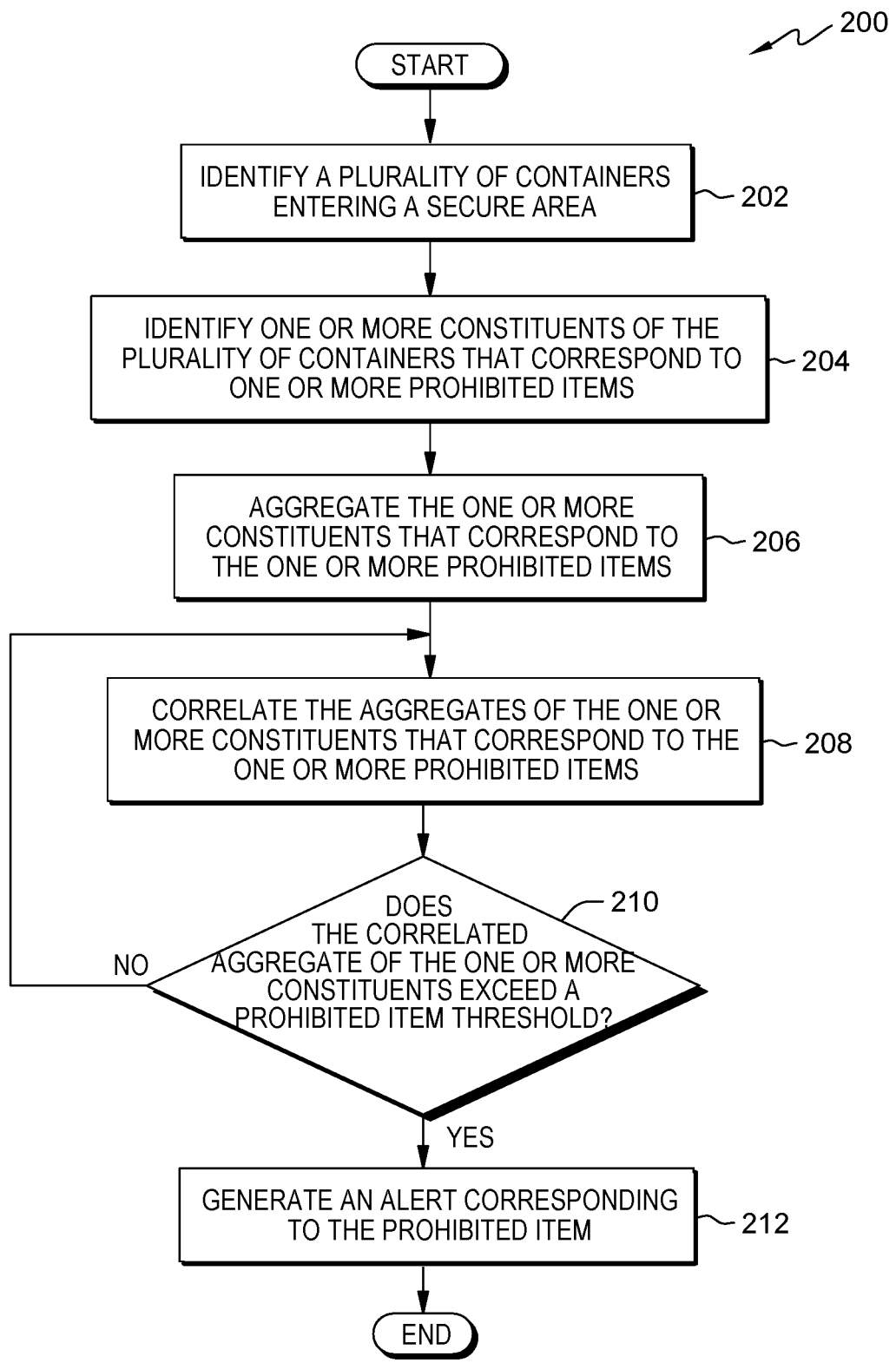
FIG. 2 is a flowchart depicting operational steps of a program, within the data processing environment of FIG. 1, for identification of a distributed prohibited item across various dimensions as well as spatial and/or temporal spaces, in accordance with embodiments of the present invention.

FIG. 2 is a flowchart depicting operational steps of security program 200, a program that identifies the probability of a distributed prohibited item based on various dimensions of a specimen with respect to spatial and/or temporal constraints, in accordance with embodiments of the present invention. In one embodiment, security program 200 initiates in response to a user connecting client device 120 to security program 200 through network 110. For example, security program 200 initiates in response to a user registering (e.g., opting-in) a laptop (e.g., client device 120) with security program 200 via a WLAN (e.g., network 110). In another embodiment, security program 200 is a background application that client device 120. For example, security program 200 is a client-side application (e.g., application 124) that initiates upon booting of a laptop (e.g., client device 120) of a user and monitors data of a screening device (e.g. detector device 120).

In step 202, security program 200 identifies a plurality of containers entering a secure area. In one embodiment, security program 200 identifies a container that enters detector device 130. For example, security program 200 tags each bag (e.g., container) that a person passes through a screening device (e.g., detector device 130) of a security lane. In this example, security program 200 codes a tag to include identifying information (e.g., assigned ID numbers, personally identifying information (PII), etc.), travel details, etc., of the person. Additionally, security program 200 tracks bags passing through one or more screening devices of security lanes using the tags (e.g., radio-frequency identification (RFID), etc.).

In an example embodiment, security program 200 can utilize an equation for assigning a unique identifier to a bag to associate the bag to a person that includes:

$$B_i(i=1 \ldots z) \tag{1}$$

where '$B_i$' is a baggage specimen (e.g., container), which is an object that contain a constituent of a prohibited item, that is uniquely tagged for identifiability at an instances 'i' that correspond to a finite set of elements from one (1) to 'z' that corresponds to the number of baggage specimens associated with a person. As a result, uniquely identifying each baggage specimen with respect to the value 'B' assigned to the person.

In another embodiment, security program 200 generates a machine learning model to identify prohibited items. For example, security program 200 creates sample sets of various sources of prohibited item information (e.g., manufacturer manuals, social media sites, intelligence agency materials, etc.) and inputs the sample sets into a machine learning model (e.g., neural network, support vector machine, etc.) to identify prohibited items (e.g., firearms, explosives, biological weapons, etc.). In this example, security program 200 utilizes the machine learning model to generate an exhaustive list of prohibited items with corresponding constituents (e.g., component parts) and relative weightage. Additionally, the machine learning model can utilize supervised or unsupervised methods to identify prohibited items.

In the example embodiment, security program 200 utilizes the machine learning model to identify, with a level of probability, what prohibited items can be composed with respect to available constituents within a secured area, where:

$$T_k(k=1 \ldots p)=TC_m(m=1 \ldots q) \tag{2}$$

where '$T_k$' is a prohibited item, 'p' is the total number of defined prohibited items, '$TC_m$' is a constituent, which is a sub-component of a prohibited item, and 'q' the list of items or constituents that are required to compose a prohibited item.

FIG. 3A depicts prohibited item model 310, which is a table security program 200 creates using the output of a machine learning model trained utilizing prebuilt samples of various real-world sources that includes various fields. Prohibited item model 310 includes the fields: prohibited item, name, W001:TC001, W002:TC002, W003:TC003, W004:TC004, W005:TC005, and W006:TC006. "Prohibited item" is a string of characters that are a unique ID assigned to each of the identified prohibited items. "Name" is a string of characters that indicates a label of the type of each of the identified prohibited items. "W001:TC001, W002:TC002, W003:TC003, W004:TC004, W005:TC005, and W006:TC006" represent one or more constituents and corresponding weights for each of the identified prohibited items.

In the example embodiment, security program 200 inputs training data sets composed from various sources such as social media sites, videos etc., that provide information of how to create prohibited items (e.g., dangerous items, volatile chemicals, hazardous materials, etc.) into an artificial intelligence and machine learning model generator. Additionally, the artificial intelligence and machine learning model generator is fed an exhaustive data set of individual components (e.g., constituents) of prohibited items, which form prohibited items subcomponents, which can be mapped together using supervised or unsupervised methods. Furthermore, security program 200 utilizes the mapped relationships (e.g., an exhaustive list of matrices) of the artificial intelligence and machine learning model generator as a model to identify constituents of prohibited items. The generated list of matrices of the model includes weighted lists of the constituents that are required to create the prohibited item (e.g., where weights correspond to the relative importance of the constituents to make the prohibited item). In one scenario, in order to construct "Item C", then "Material C", "Structure G", and "Structure H" must be present within a defined area, but "Material C" has a higher weightage (e.g., importance) than "Structure H" (e.g., TE0003 of FIG. 3A).

In step 204, security program 200 identifies one or more constituents of the plurality of containers that correspond to one or more prohibited items. In various embodiments of the present, invention security program 200 improves upon existing screening machines by automating detection of subcomponents of prohibited items utilizing a machine learning algorithm.

In one embodiment, security program 200 identifies one or more constituents of a container that enters detector device 130. For example, one or more screening devices (e.g., detector device 130) of a security lane that includes an array of sensors (e.g., sensor array 132) scan a bag (e.g., container) of a person and identifies the presence of one or more of constituents (e.g., individual subcomponents of prohibited items) in the bag within a particular dimension (e.g., X-Ray photography, chemical compound trace, biohazard trace, etc.), which is an aspect of a specimen that can be used for analysis. In this example, security program 200 utilizes the X-Ray photograph in different planes (x, y, and z axes) (e.g., output) corresponding to the scanned bag and/or data (e.g., chemical trace, biohazard trace, etc.) of the array of sensors of the one or more screening devices to determine a probability of the presence of constituents. Additionally, security program 200 associates a tag of the scanned bag with constituent results (e.g., chemical compound trace, biohazard trace, subcomponents of prohibited items, etc.) of each of the screening devices.

In the example embodiment, security program 200 inputs output data of sensor array 132 into a machine learning model to determine a quantity of one or more constituents that a bag includes (i.e., specimen (Bi) is passed through a series of sensor arrays (SA) corresponding to Dimensions (D)), wherein:

$$D_i(i=1 \ldots n) \quad (4)$$

$$SA_i(i=i \ldots n)=\{D_iS_j(j=1 \ldots m)\} \quad (5)$$

where 'n' is the number of dimensions, '$D_iS_j$' represents the '$j^{th}$' sensor in Dimension i ($D_i$), 'j' is the number of sensors in the array ($SA_i$), which outputs a Quantity (Q) in the form of:

$$SAO_i(i=i \ldots n)=\{Q(i,j)\}i=1 \ldots n, j=1 \ldots m \quad (6)$$

where the $i^{th}$ array gives a reading set of $\{Q(i, j)$, and $Q((i, j)$ is the quantity or the reading of the element being sensed by the sensor '$D_iS_j$'.

In step 206, security program 200 aggregates the one or more constituents that correspond to the one or more prohibited items. In various embodiments of the present invention, security program 200 improves upon existing screening machines by automating aggregation of subcomponents of prohibited items into a whole utilizing a machine learning algorithm while acting across spatial and temporal elements specimens of a plurality of containers.

In one embodiment, security program 200 aggregates data of one or more instances of detector device 130. For example, security program 200 generates a constituent vector for each scanned bag (e.g., container) of a security lane (e.g., detector device 130) based on probabilities of constituents of one or more dimensions of scanning of the scanned bags. In this example, as one or more bags pass through each dimension scanner unit (e.g., sensor array 132) of the security lane, security program 200 inputs the dimension scanner units transmitted scan results, which are a set association of a bag tag (e.g., RFID tag), detected constituents, and corresponding probabilities of presence. As a result, security program 200 produces a consolidated set of constituents and corresponding probabilities for each of the one or more bags (i.e., producing a constituent vector for each scanned bag).

FIG. 3B depicts scan results 320, which is a table security program 200 creates based on sensor data of sensor array 132 that includes identified constituents of one or more bags (e.g., container) that detector device 130 scans. Scan results 320 includes the fields: Baggage ID, Time Stamp, Prob: TC001, Prob:TC002, Prob:TC003, Prob:TC004, and Prob: TC005. "Baggage ID" is a string of characters that are a unique ID assigned to each scanned bag as discussed in step 202. "Time Stamp" a sequence of characters or encoded information identifying when a bag is scanned, giving a date and/or time of day. "Prob:TC001, Prob:TC002, Prob: TC003, Prob:TC004, and Prob:TC005" represent one or more constituents and corresponding probability (e.g., based on the quantity sensed) for each of the identified constituents corresponding to a specimen of a bag scanned by detector device 130. In the example embodiment, security program 200 identifies subparts or components (e.g., constituents) of equipment that can be used to assemble "Item A" or "Item B" (e.g., prohibited items) in each piece of baggage. Additionally, security program 200 determines the presence of constituents (e.g., Structure C, Structure A, Structure B, Material A, and Material E) in a scanned bag assigned the Baggage ID "B001".

In this example embodiment, security program 200 identifies a presence of the specimens of the one or more bags with respect to constituents based on an Output (O) of the '$Q(i, j)$' of each of the specimens crossing a pre-set threshold value (e.g., greater than (0.3) probability on a scale of zero (0) to one (1), where (1) is a highest possible score), wherein:

$$O_i(i=1 \ldots n)=TC_i(i=i \ldots n) \quad (7)$$

where TC(i,j)=1 when Q(i,j)≥0.3
where '0.3' is the pre-set threshold value or any other suitable algorithm for specimen presence detection.

FIG. 3C depicts vector aggregate 322, which is a table security program 200 creates based on sensor data of sensor array 132 that includes identified constituents of one or more bags (e.g., containers) that exceed a predetermined threshold. Vector aggregate 322 includes the fields: Baggage ID, Time Stamp, Prob:TC001, Prob:TC002, Prob:TC003, Prob: TC004, and Prob:TC005. "Baggage ID" is a string of characters that are a unique ID assigned to each scanned container as discussed in step 202. "Time Stamp" a sequence of characters or encoded information identifying when a bag is scanned, giving a date and/or time of day. "Prob:TC001, Prob:TC002, Prob:TC003, Prob:TC004, and Prob:TC005" represent one or more constituents and corresponding probability (e.g., based on the quantity sensed) for each of the identified constituents corresponding to a specimen of a bag scanned by detector device 130.

In the example embodiment, security program 200 compares probability values corresponding to sensed quantities of one or more detected constituents of bag "B001" to a predetermined threshold (e.g., (0.3)). Additionally, security program 200 utilizes a Baggage ID, Time Stamp, and the constituents (e.g., Structure C, Structure A, and Material A) to create a vector for the bag "B001". In this example embodiment, security program 200 excludes constituents (e.g., (e.g., Structure B, and Material E)) corresponding to detected specimens as corresponding probabilities are less than or equal to the predetermined threshold (i.e., presence of a constituent is less probable). As a result, security program 200 creates an aggregated vector with a unique ID and a list of potential constituents.

In step 208, security program 200 correlates the aggregates of the one or more constituents that correspond to the one or more prohibited items. In various embodiments of the present invention security program 200 utilizes constituent vectors of one or more containers to generate a real-time threat matrix. In one embodiment, security program 200 correlates identified constituents of a plurality of containers with one or more prohibited items. For example, security program 200 correlates of constituent sets of a plurality of bags (e.g., containers) spatially (e.g., other security lanes or entrances of a defined location) and temporally (e.g., over a defined time period) with a model set consisting of a vast array of prohibited item sets to determine a probability of constructing a prohibited item using the constituent sets of the plurality of bags. In an alternative example, security program 200 performs correlation in one or more defined locations (e.g., different airports, seaports, different cities of a country, etc.) to identify prohibited items.

In one scenario, security program 200 correlates a constituent of each of a plurality of bags with a potential prohibited item and updates a prohibited item set of the potential prohibited item with the constituent. In this scenario, the prohibited item set is a weighted list of constituents that are required to create a specific prohibited item. Also, security program 200 continuously maintains a list of sets with prohibited item creation probabilities in real-time, as security program 200 identifies constituents and corresponding weights over a defined period of time with regard to a defined location.

In the example embodiment, security program 200 utilizes prohibited item sets of all constituents with risk tagging to identify whether a combination of constituents from identified bags can be used to create a prohibited item (TE) with a certain probability, where for each (TE) there is defined a set wherein:

$$\text{Constituent Set } i = \{w_{i,j} TC_{i,j}\} \quad (8)$$

where '$w_i$' is a relative weightage (e.g., importance) of a constituent in making the Prohibited Item i. Such that Summation of $w_{i,j}$ for each Prohibited Item i is equal to 1. Thus, Constituent Set i expresses the relative importance of the $j^{th}$ Constituent in making the Prohibited Item i and that the sum of all the weightages of the constituents should be equal to one (1) for a given prohibited item.

Additionally, security program 200 utilizes a presence of constituent and to determine a probability constructing Prohibited Item i wherein:

$$(S_i TC_j) = \{P_j TC_j\} \quad (9)$$

where '$S_i$' is the $i^{th}$ specimen with constituents and '$TC_j$' is the $j^{th}$ constituent in Specimen i, for all i specimens and j Constituents in that specimen, and '$P_j$' is a Boolean indicating presence or absence of the $j^{th}$ Constituent, which security program 200 utilizes to calculate the probability of making Prohibited Item i based on the Probability of Prohibited Item i wherein:

$$\text{Probability of Prohibited Item } i = \Sigma(w_{i,j} TC_{i,j} * P_j) \quad (10)$$

FIG. 3D depicts prohibited item state profile 330, which is a table security program 200 creates using correlating vector aggregate 322 and prohibited item model 310 that takes inputs. Prohibited item state profile 330 includes the fields: prohibited item, name, W001:TC001, W002:TC002, W003:TC003, W004:TC004, W005:TC005, W006:TC006, and weighted sums. "Prohibited Item" is a string of characters that are a unique ID assigned to each of the identified prohibited items. "Name" is a string of characters that indicates a label of the type of each of the identified prohibited items. "W001:TC001, W002:TC002, W003: TC003, W004:TC004, W005:TC005, and W006:TC006" represent one or more constituents, corresponding weights, and baggage ID for each of the identified prohibited items from FIG. 3B. "Weighted Sums" is a value corresponding to a summed weight of constituents for a specific prohibited item that are identified and within a spatial and/or temporal domain set by a user.

In the example embodiment, security program 200 continuously detects the presence of identified constituents across various bags over a defined time-period and updates a 'weighted constituents' fields corresponding to a 'prohibited item' of prohibited item state profile 330. As a result, a 'weighted sums' value for the 'prohibited item' is updated based on the presence of the constituents in a bag during the defined time-period. In this example embodiment, security program 200 utilizes a numerical vale of a 'weighted sums' field to trigger an alert upon exceeding a threshold prohibited item probability of construction (e.g., defined threshold). However, in one scenario, if security program 200 determines that a 'weighted constituent' field includes an asterisk (e.g., 0.2: Structure G: B0004*), then security program 200 does not consider the 'weighted constituent' field in the 'weighted sums' of the 'prohibited item' (e.g., TE0003, TE0004) as the constituent is archived in database 144 (i.e., constituent is not within the defined time-period and/or defined location).

In decision step 210, security program 200 determines whether the correlated aggregate of the one or more constituents exceed a prohibited item threshold. In one embodiment, security program 200 determines whether a set of constituents indicate a prohibited item can be constructed or assembled in a secure location. For example, security program 200 determines whether a probability of a set of constituents is greater than a defined threshold, which indicates one or more users can construct or assemble a prohibited item in a defined location. If this weighted sum exceeds a present threshold an alarm is raised with the list of the offending baggage ids and the potential prohibited items for further action. Referring now to FIG. 3D, security program 200 utilizes a 'weighted sum' of a set of constituents corresponding to a 'prohibited item' to determine whether the 'weighted sum' exceeds a threshold prohibited item probability (e.g., defined threshold).

If security program 200 determines a set of constituents do not indicate a prohibited item is present in a secure location (decision step 210, "NO" branch), then security program 200 continues to correlate identified constituents of a plurality of containers with one or more prohibited items. For example, if security program 200 determines that a probability of a set of constituents is less than or equal to a defined threshold, then security program 200 determines that a prohibited item is not present or not capable of construction or assembly in a defined location and continues to monitor a plurality of constituent sets. Referring now to FIG. 3D, if security program 200 compares a 'weighted sum' of 'TE0004' (e.g., 0.5) to a threshold prohibited item probability (e.g., 0.7 on a scale of zero (0) to one (1)) and determines that the 'weighted sum' is less than the threshold prohibited item probability, then security program 200 continues to update 'weighted constituents' of FIG. 3D.

If security program 200 determines a set of constituents indicate one or more users corresponding to each of containers can construct or assemble a prohibited item in a secure location (decision step 210, "YES" branch), then security program 200 generates a notification to a user of client device 120. For example, if security program 200 determines that a probability of a set of constituents is greater than a defined threshold, then security program 200 determines that one or more owners of one or more bags can construct or assemble a prohibited item in a defined location. As a result, security program 200 generates a notification (e.g., alert, alarm, etc.) to a user of a computing device (e.g., client device 120) for the one or more bags (e.g., containers) that include a constituent of the set of constituents and owners of the bags be tracked and apprehended for further manual verification.

Referring now to FIG. 3D, if security program 200 compares a 'weighted sum' of 'TE0001' (e.g., 0.8) to a threshold prohibited item probability (e.g., 0.7 on a scale of zero (0) to one (1)) and determines that the construction of a "Item A" is probable due to the 'weighted sum' exceeding the threshold prohibited item probability. As a result, security program 200 generates an alert for manual intervention to intercept individual specimens (e.g., bags, containers, etc.) and associated individuals for further manual verification and threat mitigation (i.e., prevent reassembly of a prohibited item within the secure area).

In step 212, security program 200 generates an alert corresponding to the prohibited item. In one embodiment, security program 200 generates a notification on application 124 of client device 120. For example, security program 200 generates a list of individuals and bags (e.g., containers) that include a constituent of a set of constituents that correspond to a prohibited item. In this example, security program 200 transmits a notification that includes the list to a computing device (e.g., client device 120) of one or more security agents via a client-side application (e.g., application 124). Additionally, the notification can include an alarm identifying the potential prohibited item. As a result, the individuals and/or bags can be red-flagged and taken aside for further investigation.

FIG. 3E depicts threat alert index 340, which is a table security program 200 creates using prohibited item state profile 330. Threat alert index 340 includes the fields: prohibited item, name, and baggage IDs list. "Prohibited Item" is a string of characters that are a unique ID assigned to each of the identified prohibited items. "Name" is a string of characters that indicates a label of the type of the identified prohibited item and corresponding weighted sum of constituent. "Baggage IDs List" is a list of unique IDs of bags that include constituents for an identified prohibited item. In the example embodiment, security program 200 utilizes various fields of prohibited item state profile 330 to generate threat alert index 340. Additionally, security program 200 transmits threat alert index 340 to client device 120 to alert of a list of the offending baggage ids and the potential prohibited item (e.g., TE0001, Item A) for further action by a security agent.

Figure 4:
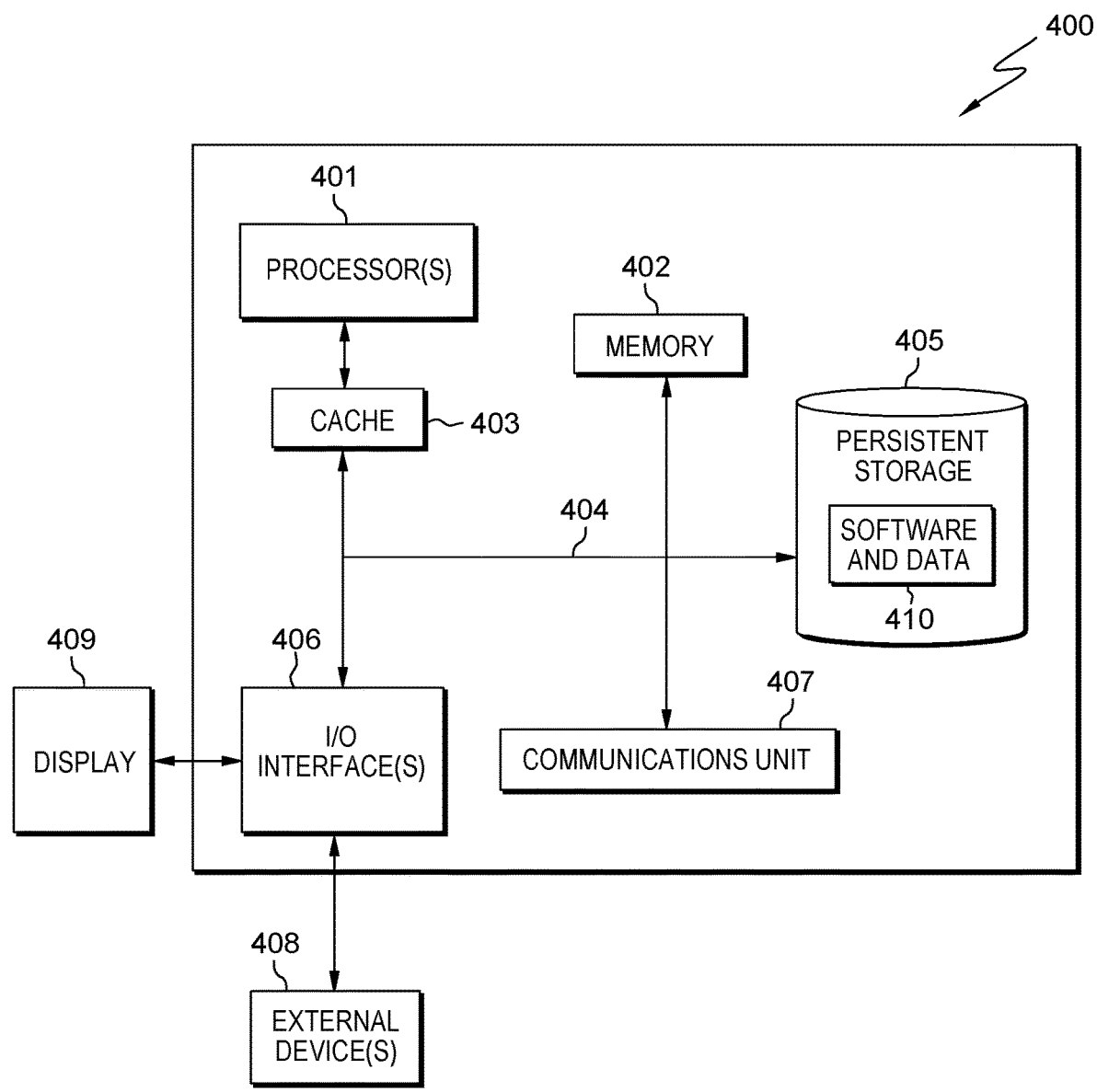
FIG. 4 is a block diagram of components of the client device and server of FIG. 1, in accordance with an embodiment of the present invention.

FIG. 4 depicts a block diagram of components of client device 120, detector device 130 and server 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to client device 120, software and data 410 includes data of user interface 122 and application 124. With respect to detector device 130, software and data 410 includes data of sensor array 132. With respect to server 140, software and data 410 includes data of storage device 142 and security program 200.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    assigning, by one or more processors, an identifier to each container of a plurality of containers entering a defined area;
    determining, by the one or more processors, one or more subcomponents of the plurality of containers entering the defined area that correspond to one or more prohibited items;
    generating, by the one or more processors, a set of subcomponents corresponding to a first prohibited item of the one or more prohibited items based at least in part on the plurality of containers; and
    determining, by the one or more processors, whether the set of subcomponents corresponding to the first prohibited item exceeds a prohibited item threshold of the defined area based at least in part on a weighted sum of the set of subcomponents, wherein the weighted sum is a score related to the set of subcomponents.

2. The method of claim 1, further comprising:
    in response to determining that the set of subcomponents corresponding to the first prohibited item exceeds the prohibited item threshold of the defined area, generating, by the one or more processors, a list of identifiers of each container of the set of subcomponents; and
    transmitting, by the one or more processors, a notification to a user that includes the generated list.

3. The method of claim 1, further comprising:
    generating, by the one or more processors, a prohibited item model utilizing a machine learning algorithm, wherein the prohibited item model includes matrices of prohibited item subcomponent sets; and
    correlating, by the one or more processors, the set of subcomponents corresponding to the first prohibited item with a prohibited item subcomponent set of the matrices based at least in part on spatial and temporal domains of each subcomponent of the set of subcomponents corresponding to the first prohibited item.

4. The method of claim 3, wherein correlating the set of subcomponents corresponding to the first prohibited item with the prohibited item subcomponent set of the matrices, further comprises:
    identifying, by the one or more processors, a weight of the prohibited item subcomponent set corresponding to each respective subcomponent of the set of subcomponents corresponding to the first prohibited item; and
    determining, by the one or more processors, the weighted sum of the set of subcomponents corresponding to the first prohibited item, wherein the weighted sum is associated with a probability of construction of the first prohibited item.

5. The method of claim 1, wherein determining the one or more subcomponents of the plurality of containers entering the defined area that correspond to the one or more prohibited items, further comprises:
    identifying, by the one or more processors, a trace amount of a specimen in a container of the plurality of containers utilizing an output data of a sensor of a computing device, wherein the specimen corresponds to a subcomponent of the set of subcomponents corresponding to a first prohibited item of the one or more prohibited items; and
    assigning, by the one or more processors, a dimension to the container of the plurality of containers corresponding to information of the sensor of the computing device, wherein the information includes a specimen type the sensor detects.

6. The method of claim 5, wherein assigning the dimension to the container of the plurality of containers corresponding to the information of the sensor of the computing device, further comprises:
    determining, by the one or more processors, a spatial constraint corresponding to the specimen; and
    determining, by the one or more processors, a temporal constraint corresponding to the specimen.

7. The method of claim 1, wherein generating the set of subcomponents corresponding to the first prohibited item of the one or more prohibited items based at least in part on the plurality of containers, further comprises:
    quantifying, by the one or more processors, an output of a sensor that detects a subcomponent of a container of the plurality of containers entering the defined area, wherein the subcomponent corresponds to the first prohibited item; and
    determining, by the one or more processors, whether the quantified output exceeds a subcomponent threshold value.

8. A computer program product comprising:
    one or more non-transitory computer readable storage media and program instructions stored on the one or more computer readable storage media, the program instructions comprising:
        program instructions to assign an identifier to each container of a plurality of containers entering a defined area;
        program instructions to determine one or more subcomponents of the plurality of containers entering the defined area that correspond to one or more prohibited items;
        program instructions to generate a set of subcomponents corresponding to a first prohibited item of the one or more prohibited items based at least in part on the plurality of containers; and
        program instructions to determine whether the set of subcomponents corresponding to the first prohibited item exceeds a prohibited item threshold of the defined area based at least in part on a weighted sum of the set of subcomponents, wherein the weighted sum is a score related to the set of subcomponents.

9. The computer program product of claim 8, further comprising program instructions, stored on the one or more computer readable storage media, to:
    in response to determining that the set of subcomponents corresponding to the first prohibited item exceeds the prohibited item threshold of the defined area, generate a list of identifiers of each container of the set of subcomponents; and
    transmit a notification to a user that includes the generated list.

10. The computer program product of claim 8, further comprising program instructions, stored on the one or more computer readable storage media, to:

generate a prohibited item model utilizing a machine learning algorithm, wherein the prohibited item model includes matrices of prohibited item subcomponent sets; and correlate the set of subcomponents corresponding to the first prohibited item with a prohibited item subcomponent set of the matrices based at least in part on spatial and temporal domains of each subcomponent of the set of subcomponents corresponding to the first prohibited item.

11. The computer program product of claim 10, wherein program instructions to correlate the set of subcomponents corresponding to the first prohibited item with a prohibited item subcomponent set of the matrices, further comprise program instructions to:

identify a weight of the prohibited item subcomponent set corresponding to each respective subcomponent of the set of subcomponents corresponding to the first prohibited item; and determine a weighted sum of the set of subcomponents corresponding to the first prohibited item, wherein the weighted sum is associated with a probability of construction of the first prohibited item.

12. The computer program product of claim 8, wherein program instructions to determine the one or more subcomponents of the plurality of containers entering the defined area that correspond to the one or more prohibited items, further comprise program instructions to:

identify a trace amount of a specimen in a container of the plurality of containers utilizing an output data of a sensor of a computing device, wherein the specimen corresponds to a subcomponent of the set of subcomponents corresponding to a first prohibited item of the one or more prohibited items; and assign a dimension to the container of the plurality of containers corresponding to information of the sensor of the computing device, wherein the information includes a specimen type the sensor detects.

13. The computer program product of claim 12, wherein program instructions to assign the dimension to the container of the plurality of containers corresponding to the information of the sensor of the computing device, further comprise program instructions to:

determine a spatial constraint corresponding to the specimen; and determine a temporal constraint corresponding to the specimen.

14. The computer program product of claim 8, wherein program instructions to generate the set of subcomponents corresponding to the first prohibited item of the one or more prohibited items based at least in part on the plurality of containers, further comprise program instructions to:

quantify an output of a sensor that detects a subcomponent of a container of the plurality of containers entering the defined area, wherein the subcomponent corresponds to the first prohibited item; and determine whether the quantified output exceeds a subcomponent threshold value.

15. A computer system comprising:
one or more computer processors;
one or more computer readable storage media; and
program instructions stored on the computer readable storage media for execution by at least one of the one or more processors, the program instructions comprising:

program instructions to assign an identifier to each container of a plurality of containers entering a defined area;

program instructions to determine one or more subcomponents of the plurality of containers entering the defined area that correspond to one or more prohibited items;

program instructions to generate a set of subcomponents corresponding to a first prohibited item of the one or more prohibited items based at least in part on the plurality of containers; and program instructions to determine whether the set of subcomponents corresponding to the first prohibited item exceeds a prohibited item threshold of the defined area based at least in part on a weighted sum of the set of subcomponents, wherein the weighted sum is a score related to the set of subcomponents.

16. The computer system of claim 15, further comprising program instructions, stored on the one or more computer readable storage media for execution by at least one of the one or more processors, to:

in response to determining that the set of subcomponents corresponding to the first prohibited item exceeds the prohibited item threshold of the defined area, generate a list of identifiers of each container of the set of subcomponents; and transmit a notification to a user that includes the generated list.

17. The computer system of claim 15, further comprising program instructions, stored on the one or more computer readable storage media for execution by at least one of the one or more processors, to:

generate a prohibited item model utilizing a machine learning algorithm, wherein the prohibited item model includes matrices of prohibited item subcomponent sets; and correlate the set of subcomponents corresponding to the first prohibited item with a prohibited item subcomponent set of the matrices based at least in part on spatial and temporal domains of each subcomponent of the set of subcomponents corresponding to the first prohibited item.

18. The computer system of claim 17, wherein program instructions to correlate the set of subcomponents corresponding to the first prohibited item with a prohibited item subcomponent set of the matrices, further comprise program instructions to:

identify a weight of the prohibited item subcomponent set corresponding to each respective subcomponent of the set of subcomponents corresponding to the first prohibited item; and determine a weighted sum of the set of subcomponents corresponding to the first prohibited item, wherein the weighted sum is associated with a probability of construction of the first prohibited item.

19. The computer system of claim 17, wherein program instructions to correlate the set of subcomponents corresponding to the first prohibited item with the prohibited item subcomponent set of the matrices, further comprise program instructions to:

identify a trace amount of a specimen in a container of the plurality of containers utilizing an output data of a sensor of a computing device, wherein the specimen corresponds to a subcomponent of the set of subcomponents corresponding to the first prohibited item of the one or more prohibited items; and assign a dimension to the container of the plurality of containers corresponding to information of the sensor of the computing device, wherein the information includes a specimen type the sensor detects.

20. The computer system of claim 19, wherein program instructions to assign the dimension to the container of the plurality of containers corresponding to the information of the sensor of the computing device, further comprise program instructions to:
 determine a spatial constraint corresponding to the specimen; and
 determine a temporal constraint corresponding to the specimen.

* * * * *